United States Patent Office 3,280,127
Patented Oct. 18, 1966

3,280,127
PIPERAZINE DERIVATIVES OF DIHYDROXY-
BENZOIC ACID
Gilbert Regnier, Sceaux, Roger Canevari, La Haye Les Roses, and Jean Claude Le Douarec, Versailles, France, assignors to Science Union et Cie, Societe Francaise de Recherche Medicale, Seine, France
No Drawing. Filed Oct. 1, 1964, Ser. No. 400,879
Claims priority, application Great Britain, Oct. 14, 1963, 40,495/63
10 Claims. (Cl. 260—268)

The invention provides, as new compounds, derivatives of dihydroxy benzoic acid of the general formula

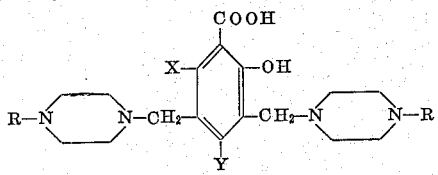

wherein R represents a phenyl nucleus or a phenyl nucleus substituted, in the ortho, meta or para position, by a halogen atom, for example, F, Cl or Br, by one or more lower alkyl radicals or lower alkoxy groups such, for example, as methyl, ethyl, isopropyl, butyl, pentyl or methoxy, ethoxy, propoxy, butoxy, pentyloxy or a methylenedioxy group, X and Y represent alternatively a hydrogen atom or a hydroxyl group; accordingly if
X=H, Y=OH, a derivative of 2:4-dihydroxybenzoic acid is obtained and if
X=OH, Y=H, a derivative of 2:6 dihydroxybenzoic acid is obtained All these derivatives can be prepared by a method, the so-called Mannich method, which consists in reacting a dihydroxybenzoic acid of the general formula

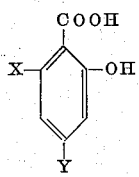

in which X and Y have the meanings given above, with a mono-substituted piperazine of the general formula

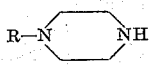

in which R represents a phenyl nucleus or substituted phenyl nucleus as defined above, in the presence of formaldehyde.

A suitable method of operation for such a reaction comprises treating a mono-substituted piperazine in a polar solvent chosen from among the alcohols of low molecular weight miscible with water in all proportions, such, for example as methanol, ethanol, isopropanol, with an aqueous solution of formaldehyde in slight excess and the salicylic acid, which may be substituted, in molecular proportions.

It is preferable in all cases to operate in solution. A particularly advantageous modification in the case where the acid used is poorly soluble in the solvent selected is to use it in the form of an alkali metal salt, such as a sodium, potassium or lithium salt, in aqueous solution. The advantage of such a variant is keeping the starting materials and the final product in solution from the beginning to the end of the reaction.

The reaction time varies from 24 to 72 hours at laboratory temperature (20–25° C.), but the reaction can be accelerated in certain cases by heating to a temperature not exceeding 50° C. The reaction product generally crystallises in the reaction medium, unless the salicylic acid employed is in the form of an alkali metal salt, in which case neutralisation must be carried out by means of a strong acid such as hydrochloric or sulphuric acid.

The new derivatives of salicyclic acid, which are strong bases, can be transformed into addition salts with mineral and organic acids. The addition salts can be obtained by the action of the new derivatives on acids in suitable solvents; as organic solvents there may be used, for example, alcohols, ethers, ketones; water is used with advantage as mineral solvent; as acids used for the formation of these addition salts there may be mentioned, in the mineral series: hydrochloric, hydrobromic, methanesulphonic, sulphuric and phosphoric acid; in the organic series: acetic, maleic, fumaric, oxalic, tartaric, citric, benzoic acid etc.

These new derivatives may if necessary be purified by physical methods, such as crystallisation, distillation or chromatography, or chemical methods such as the formation of previously defined salts, crystallisation of the latter and decomposition by means of alkaline agents with a pH value of 7.

The derivatives according to the present invention have valuable pharmacological properties and particularly outstanding are analgesic, antipyretic and anti-inflammatory activity thereof.

This activity is all the more remarkable that they have an extremely low toxicity. $LD_{50}$, when determined in mice by oral administration is more than 3 gr./kg.

The analgesic activity is demonstrated by the hot plate test of Woolf and MacDonald in mice. It was found that compounds of the invention, when administered perorally or intraperitoneally at the dose of 50 to 100 mg./kg., increase to 50% the threshold of pain perception of animals in comparison with those untreated.

When administered at the dose of 30 mg./kg. IP to the rabbit inoculated with an anti-gonococcic vaccine containing 15 million/kg. of germ, a pronounced antipyretic activity is shown.

Anti-inflammatory properties have been studied on plantar oedema of the rat's paw induced by subaponeurotic injection of kaolin.

Compounds of the invention when administered orally during 3 days at the total dose of 400/mg./kg. to the rats, inhibit inflammation at about 40% of those untreated. Activity of Na salicylate in this test is less than 20%.

The new compounds may be used as medicaments and may be administered to a living animal body, preferably in the form of pharmaceutical preparations which contain the compounds in admixture or conjunction with a pharmaceutical organic or inorganic solid or liquid carrier suitable for oral, rectal or parenteral administration.

For making up the preparations there may be employed substances which do not react with the new compounds, such as water, lactose, starches, talc, magnesium carbonate, aluminum glycinate, polyvinyl pyrrolidone or other known carriers.

The pharmaceutical preparations may be in solid form, foor example as tablets, dragees, capsules or suppositories, or in liquid form as solutions, suspensions or emulsions. The doses can vary from about 50 to about 500 mg.

The compound bis-3:5[4'-(2"-methoxyphenyl) piperazinyl methyl]-2:4-dihydroxybenzoic acid was administered orally to human patients suffering from chronic polyarthritis.

At the dose of 200 mg., 3 times a day during 10 to 30 days, a decrease of articular-pain was observed very shortly and in a few days, inflammatory symptoms decreased also. The drug was always well tolerated and no side effect was observed.

The following examples illustrated the invention. The melting points indicated were determined by the Kofler micro-method.

EXAMPLE 1

*Bis-3:5[4'(2''-methoxyphenyl) piperazinyl methyl]-2:4-dihydroxybenzoic acid*

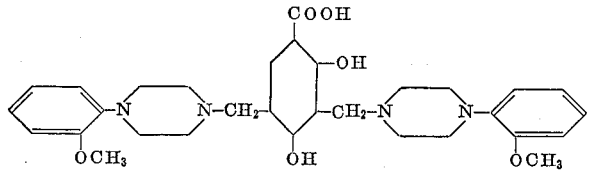

To a solution of 15.4 grams of orthomethoxyphenyl piperazine in 250 cc. of ethanol there were added a solution of 6.1 grams of 2:4-dihydroxybenzoic acid in the form of sodium salt in 15 cc. of water and 60 cc. of ethanol and, in 5 minutes 9 cc. of an aqueous solution of formaldehyde of 40% strength. The temperature of the solution increased from 22° to 24° C. during the time that the formaldehyde was added. The solution obtained was then left for 24 hours at ordinary temperature and then (if necessary) the slight precipitate formed was filtered off. The solution was then heated at 50° C. for one hour and was then neutralised to a pH of 8 with 20.5 cc. of 2-N hydrochloric acid and 100 cc. of water were added to the solution. By slow cooling to +10° C., and after filtering and drying, 10.9 grams of crystallised base melting at 198–206° C. were recovered.

By adding 450 cc. of water to the filtrate, a second yield weighing 6 grams and melting at 198–206° C. was recovered. The base could be crystallised if required with one or two molecules of water.

The corresponding tetrahydrochloride melted at 178–179° C. (with decomposition). It was crystallised in the form of monohydrate.

EXAMPLE 2

*Bis-3:5[4'-(3''-methoxyphenyl) piperazinyl methyl]-2:4-dihydroxybenzoic acid* prepared as in Example 1 from β-resorcylic acid and (3'-methoxyphenyl)-piperazine. The base melts at 170°–175° C. and the corresponding tetrahydrochloride crystallised with one molecule of water melts at 189–194° C. (with decomposition).

EXAMPLE 3

*Bis-3:5[4'-(4''-methoxyphenyl) piperazinyl methyl]-2:4-dihydroxybenzoic acid* prepared as in Example 1 from β-resorcylic acid and (4'-methoxyphenyl)-piperazine. The base melts at 209–210° C. and the corresponding tetrahydrochloride crystallised with one molecule of water melts at 180–185° C. (with decomposition).

EXAMPLE 4

*Bis-3:5[4'-(2''-methoxyphenyl) piperazinyl methyl]-2:6-dihydroxybenzoic acid* prepared as in Example 1 from γ-resorcylic acid and (2'-methoxyphenyl)-piperazine. The corresponding tetrahydrochloride crystallised with two molecules of water melts at 168–173° C. (with decomposition).

EXAMPLE 5

*Bis-3:5[4'-(2''-chlorophenyl) piperazinyl methyl]-2:4-dihydroxybenzoic acid* prepared as in Example 1 from β-resorcylic acid and (2'-chlorophenyl)-piperazine. The corresponding dihydrochloride crystallised with 1.5 molecule of water melts at 172–173° C. (with decomposition).

EXAMPLE 6

*Bis-3:5[4'-(3''-chlorophenyl) piperazinyl methyl]-2:4-dihydroxybenzoic acid* prepared as in Example 1 from β-resorcylic acid and (3'-chlorophenyl)-piperazine. The corresponding tetrahydrochloride crystallised with one molecule of water melts at 178–185° C. (with decomposition).

EXAMPLE 7

*Bis-3:5[4'-(4''-chlorophenyl) piperazinyl methyl]-2:4-dihydroxybenzoic acid* prepared as in Example 1 from β-resorcylic acid and (4'-chlorophenyl)-piperazine. The corresponding anhydrous base melts at 213–215° C. (with decomposition).

EXAMPLE 8

*Bis-3:5[4'-(2''-methylphenyl) piperazinyl methyl]-2:4-dihydroxybenzoic acid* prepared as in Example 1 from β-resorcylic acid and (2'-methylphenyl)-piperazine. The corresponding base crystallised with one molecule of water melts at 213–215° C. (with decomposition).

EXAMPLE 9

*Bis-3:5[4'-(3''-methylphenyl) piperazinyl methyl]-2:4-dihydroxybenzoic acid* prepared as in Example 1 from β-resorcylic acid and (3'-methylphenyl)-piperazine. The corresponding base crystallised with one molecule of water melts at 179–182° C. (with decomposition).

EXAMPLE 10

*Bis-3:5[4'-(4''-methylphenyl) piperazinyl methyl]-2:4-dihydroxybenzoic acid* prepared as in Example 1 from β-resorcylic acid and (4'-methylphenyl)-piperazine. The corresponding tetrahydrochloride crystallised with two molecules of water melts at 200–203° C. (with decomposition).

It is to be understood that the invention is not to be limited to the exact details of operation or exact compounds, compositions or procedures shown and described, as obvious modifications and equivalents will be apparent to one skilled in the art, and the invention is therefore to be limited only by the scope of the appended claims.

What we claim is:

1. A compound selected from the group consisting of (a) dihydroxybenzoic acid derivatives of the formula

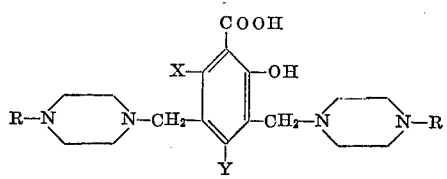

wherein R is selected from the group consisting of phenyl, halophenyl, lower-alkylphenyl, lower-alkoxyphenyl, and methylenedioxyphenyl, and wherein X and Y are each individually selected from the group consisting of hydrogen and hydroxy, and (b) pharmaceutically acceptable acid addition salts thereof.

2. A bis 3:5[4' - (lower - alkylphenyl) piperazinyl methyl]-2:4-dihydroxybenzoic acid pharmaceutically acceptable acid addition salt.

3. A bis 3:5[4' - (lower - alkoxyphenyl) piperazinyl methyl]-2:4-dihydroxybenzoic acid pharmaceutically acceptable acid addition salt.

4. A bis 3:5[4'-(halophenyl) piperazinyl methyl]-2:4-dihydroxybenzoic acid pharmaceutically acceptable acid addition salt.

5. A bis 3:5[4' - (lower - alkoxyphenyl) piperazinyl methyl]-2:6-dihydroxybenzoic acid pharmaceutically acceptable acid addition salt.

6. A bis 3:5[4' - (2'' - methoxyphenyl) piperazinyl methyl]-2:4-dihydroxybenzoic acid pharmaceutically acceptable acid addition salt.

7. A bis 3:5[4' - (2'' - methoxyphenyl) piperazinyl methyl]-2:6-dihydroxybenzoic acid pharmaceutically acceptable acid addition salt.

8. A bis 3:5[4'-(2''-chlorophenyl) piperazinyl methyl]-2:4-dihydroxybenzoic acid pharmaceutically acceptable acid addition salt.

9. A bis 3:5[4'-(2''-methylphenyl) piperazinyl methyl]-2:4-dihydroxybenzoic acid pharmaceutically acceptable acid addition salt.

10. A bis 3:5[4' - (4'' - methylphenyl) piperazinyl methyl]-2:4-dihydroxybenzoic acid pharmaceutically acceptable acid addition salt.

No references cited.

ALEX MAZEL, *Primary Examiner.*

HENRY R. JILES, *Examiner.*

JAMES W. ADAMS, Jr., *Assistant Examiner.*